Oct. 8, 1968 R. C. FERGASON 3,404,514
SCREEN CLEANING DEVICE
Filed Sept. 20, 1967 3 Sheets-Sheet 1

Inventor
Rector C. Fergason
By Robert C. Sullivan
Attorney

Oct. 8, 1968   R. C. FERGASON   3,404,514
SCREEN CLEANING DEVICE
Filed Sept. 20, 1967   3 Sheets-Sheet 2

Inventor
Rector C. Fergason
By Robert C. Sullivan
Attorney

Oct. 8, 1968 R. C. FERGASON 3,404,514
SCREEN CLEANING DEVICE
Filed Sept. 20, 1967 3 Sheets-Sheet 3
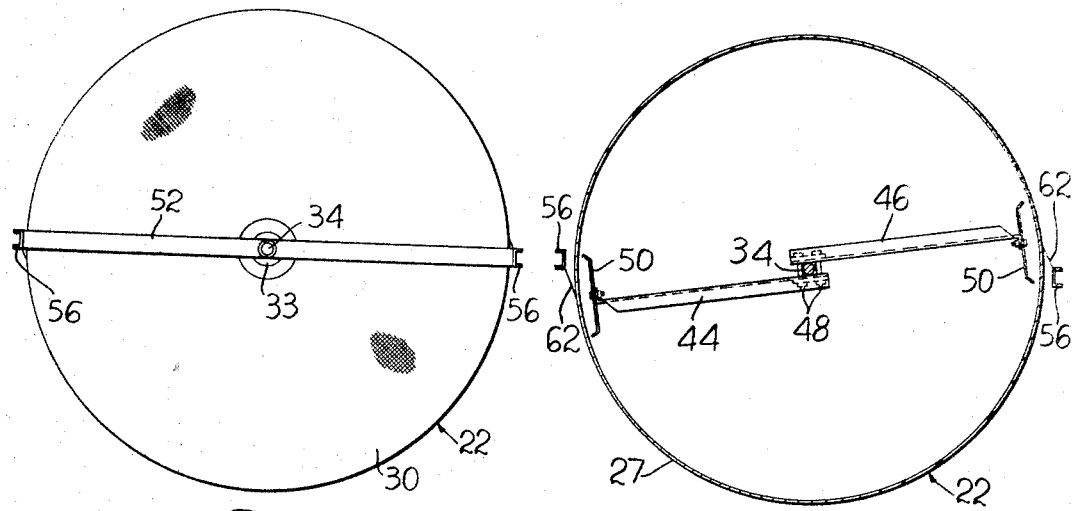
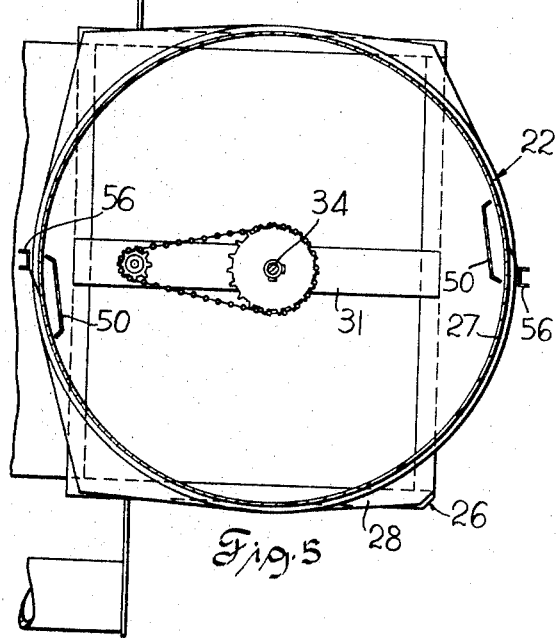
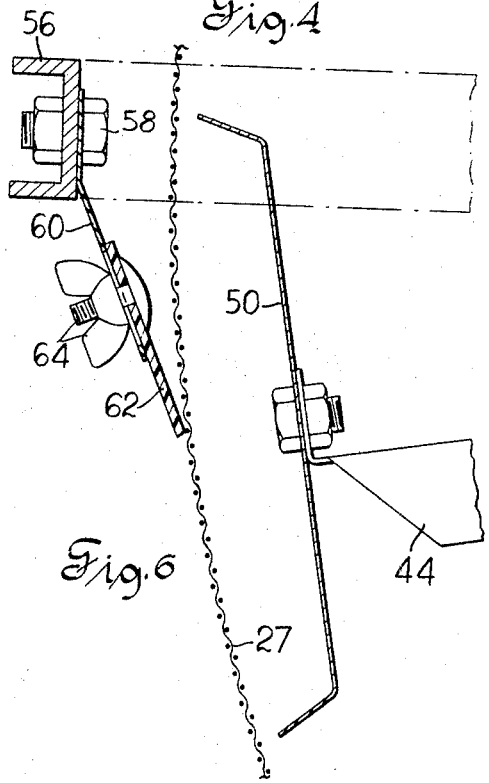
Inventor
Rector C. Fergason
By Robert C. Sullivan
Attorney

United States Patent Office 3,404,514
Patented Oct. 8, 1968

3,404,514
SCREEN CLEANING DEVICE
Rector C. Fergason, Gadsden, Ala., assignor to Allis-Chalmers Manufacturing Company, Milwaukee, Wis.
Filed Sept. 20, 1967, Ser. No. 669,160
2 Claims. (Cl. 55—295)

ABSTRACT OF THE DISCLOSURE

A self-cleaning radiator screen used for filtering cooling air for engines on farm machinery, such as cotton pickers, combines or the like. A stationary cylindrical screen is provided having wiper blades rotating about the vertical axis of the screen in contact with the external surface of the screen, and internal baffles rotating with the wiper blades so that the portion of the screen being scraped will always be shielded from the draft tending to retain the material against the screen, thereby facilitating removal of the material from the screen by the wiper blades.

---

This invention relates to air filter screens for the radiators of engines used on farm machinery such as cotton pickers, combines, or the like, and more particularly to a self-cleaning radiator screen for use with farm machinery or the like.

A problem arises in connection with screen filters for the air supply to the radiators of internal combustion engines used on farm machinery such as cotton pickers, combines, or the like; namely, that lint, chaff, and other debris accumulates on the screen and prevents the passage of air to cool the radiator. The fan behind the radiator pulls the air through the screen, thereby causing the lint and other debris in the air to be pulled against the screen. When the screen becomes clogged with lint the air cannot pass through, causing the engine to overheat.

Various types of cleaning devices have been provided to supplement conventional screens. However, none of the prior art devices has proved entirely satisfactory for this purpose.

Accordingly, it is an object of this invention to provide an improved self-cleaning radiator screen for use with farm machinery such as cotton pickers, combines, or the like.

It is another object of the invention to provide the self-cleaning radiator screen for use with farm machinery, or the like, which includes means for shielding the portion of the screen being scraped from the draft which tends to draw the material against the screen, thereby facilitating removal of the foreign material from the screen by the scraper.

In achievement of these objectives, there is provided in accordance with this invention a self-cleaning radiator screen for filtering cooling air for engines on farm machinery such as cotton pickers, combines, or the like. A stationary cylindrical screen is provided having wiper blades rotating about the vertical axis of the screen in contact with the external surface of the screen, and internal baffles rotating with the wiper blades so that the portion of the screen being scraped will always be shielded from the draft tending to retain the material against the screen, thereby facilitating removal of the material from the screen by the wiper blades.

Further features of the invention will become apparent from the following description, taken in connection with the accompanying drawings wherein:

FIG. 3 is a plan view of the radiator screen and cleaning device;

FIG. 4 is a cross sectional view taken along line IV—IV of FIG. 2;

FIG. 5 is a cross sectional view taken on line V—V of FIG. 2 showing the drive for the baffle and scraper; and FIG. 6 is an enlarged view showing the mounting for the scraper blade and baffle.

Figure 1:
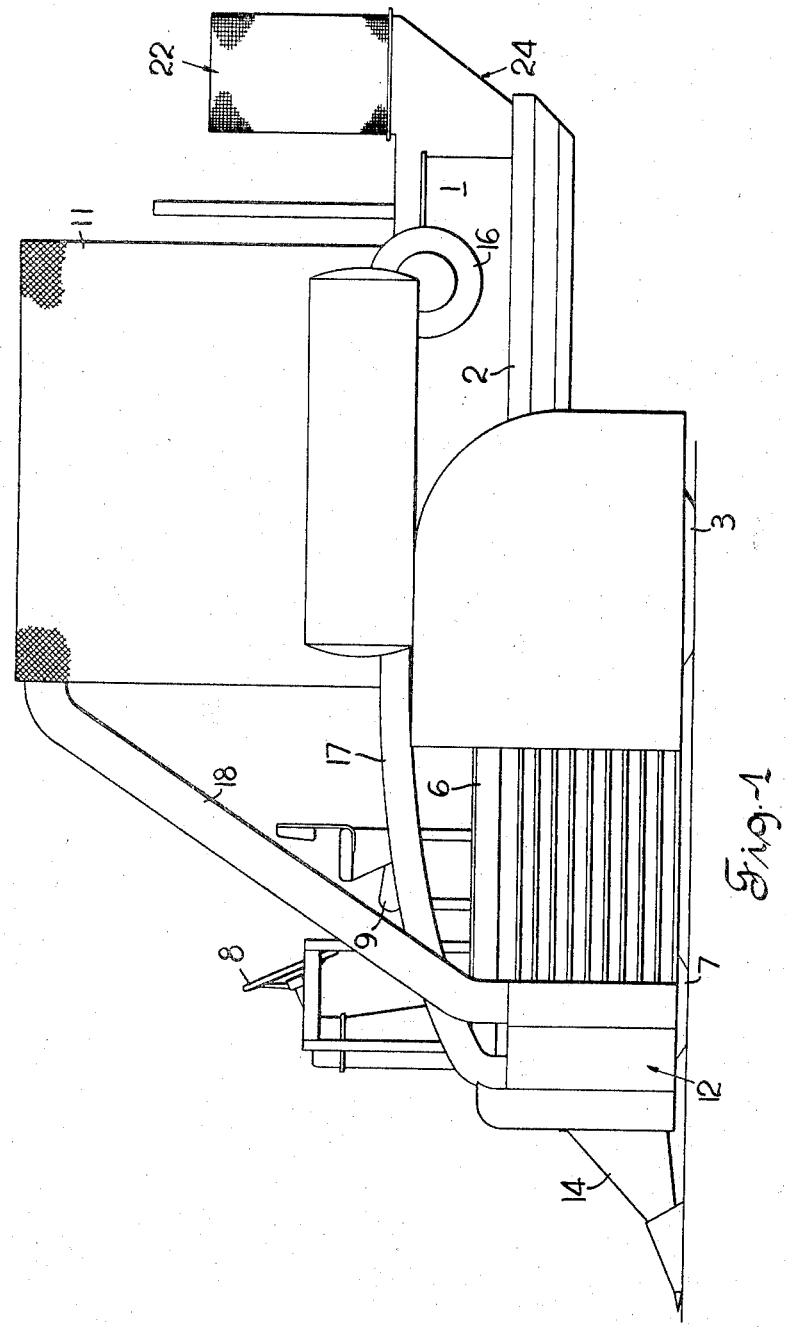
FIG. 1 is a side elevation view of a drum type cotton harvester.

Referring to FIG. 1, the cotton harvester embodying the invention consists generally of an engine 1 joined to an axle housing (not shown) and supported thereby as a cantilever beam. A frame member 2 supports engine 1 from the axle housing. A pair of laterally spaced traction wheels 3 (only one is shown) are operatively connected to opposite ends of the axle housing in a conventional manner. A forwardly extending frame 6 is attached at its rear end on the axle housing. The forward end of frame 6 is supported on a dirigible wheel 7 which is operatively connected to steering wheel 8 carried by the front end of frame 6. An operator's seat 9 is carried by frame 6 rearwardly of the steering wheel 8. A picked cotton receiving basket 11 is carried on frame members 6 and 2 rearwardly of operator's seat 9. Cotton picker assemblies 12 are mounted on each side of the forward end of frame 6. These assemblies are carried by a subframe which is adjustably connected to frame 6 for vertical movement relative thereto. The forward end of assemblies 12 (see FIG. 1) are provided with plant dividers 14 which guide cotton plants into contact with cotton pickers which are positioned just rearwardly of the plant dividers. Frame 2 supports a blower 16 which is provided with a duct 17 which delivers pressurized air to picking assembly 12 and a cotton delivering duct 18 for depositing picked cotton into basket 11.

Figure 2:
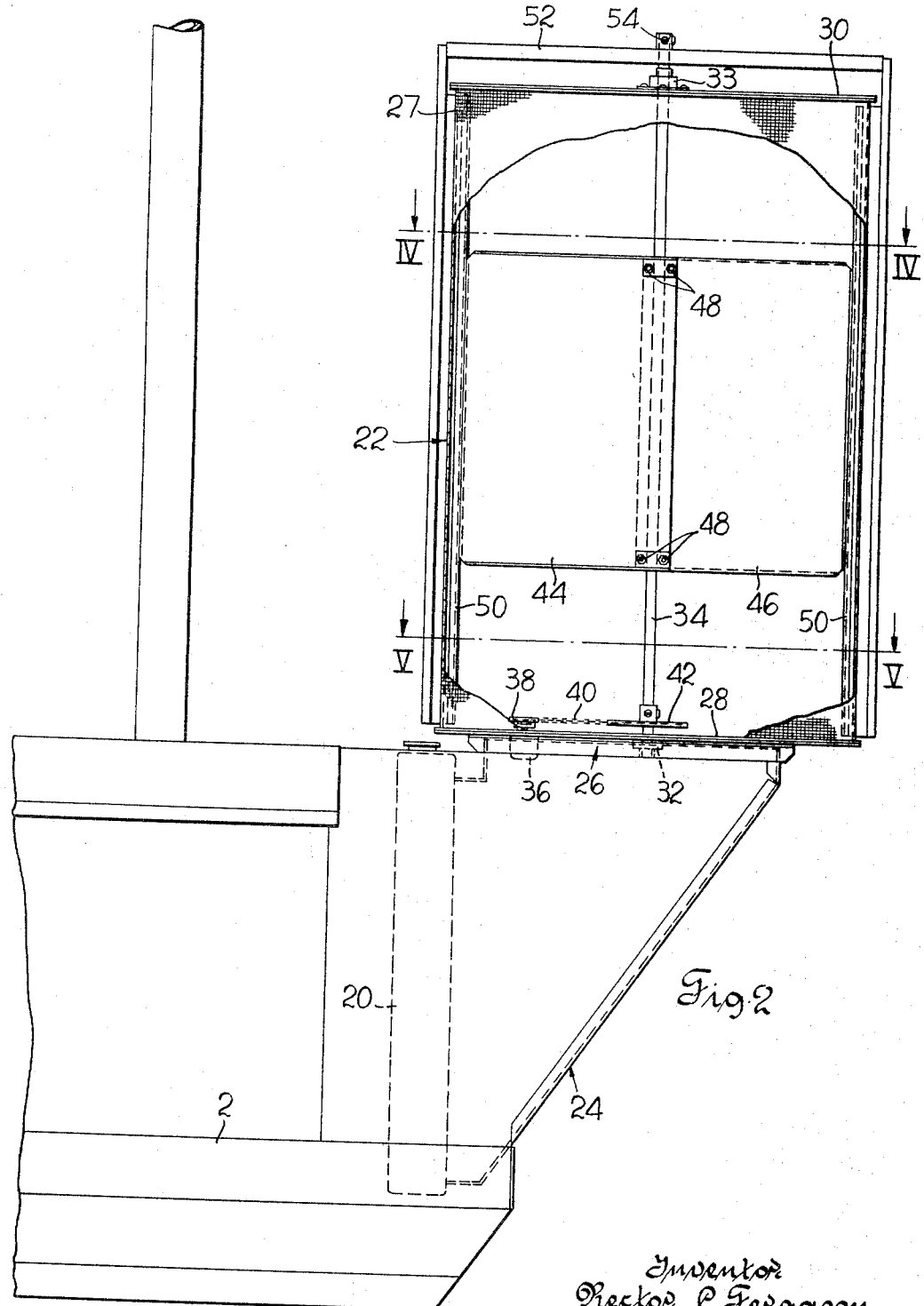
FIG. 2 is an enlarged side view of the radiator, screen cleaning device, and duct work of the invention, parts of which are broken away.

Referring now to FIG. 2, the radiator 20 is suitably mounted on the frame member 2 of the cotton harvester. A conventional fan, not shown, but located on the downstream or lefthand side of the radiator with respect to the view shown in FIG. 2, draws cooling air through radiator 20. The cooling air supplied to the radiator passes through the self-cleaning screen assembly generally indicated at 22 and is communicated to radiator 20 by means of connecting duct 24 which is suitably secured in air-tight relation with radiator 20. Duct 24 is provided with a clean-out door (not shown).

A rectangular screen base assembly indicated at 26, and consisting of four angle iron members rigidly held together by means of welding, is secured to the upper end of duct 24 and forms a support for screen assembly 22.

The screen assembly 22 comprises a stationary vertically extending cylindrical screen 27, a bottom plate 28 having a rectangular opening therein of substantially the same size as and in registry with the opening in the upper end of duct 24, and rigidly secured to base assembly 26 by bolts or the like, and an upper plate 30.

The rectangular opening of the bottom plate 28 of the screen assembly 22 is bridged by a cross member 31 (FIG. 5) on which is mounted a bearing 32 to rotatably support a vertical drive shaft 34. The upper end of shaft 34 is rotatably received by a bearing 33 secured to the upper plate 30 of the cylindrical screen assembly 22. Shaft 34 is driven by an electric motor 36 through a chain drive including a drive sprocket 38 on the motor shaft, a chain 40, and a driven sprocket 42 secured to shaft 34.

A pair of support arms 44 and 46, respectively, are secured by bolts 48 to the drive shaft 34. Vertical baffle members 50 are secured to the outer ends of the support arms 44 and 46 and are adapted to rotate adjacent the inner surface of the screen cylinder 27. Baffle members 50 extend the entire height of the screen cylinder 27 and effectively shield a limited area of the screen cylinder against the draft caused by the radiator fan.

The drive shaft 34 extends upwardly above the top plate 30 of screen assembly 22 and has the center portion of an arm assembly 52 secured thereto by suitable means such as a set screw 54. The arm assembly 52 extends outwardly beyond the periphery of the screen cylinder and has downwardly depending scraper arms 56 secured to the ends thereof as by means of bolts 58 (FIG. 6). The arms 56 carry radially inwardly bent support members 60 to which a scraper member 62 of nylon or the like is adjustably secured as by the fastening means 64. The scrapers 62 contact the outer face of the screen cylinder 27 and extend for the entire height thereof to effectively scrape the lint and other foreign material from the outer face of the screen cylinder.

It should be noted, as best seen in the view of FIG. 6, that the internal baffle members 50 and the external scraper members 62 are radially aligned and rotate in unison with the rotation of shaft 34 so that the portion of the surface of the screen cylinder which is being scraped by a scraper 62 is always the same surface portion which is shielded by the corresponding baffle member 50. Thus, the cooperative relationship between the baffles 50 and the scrapers 62 assure that the portion of the screen which is being shielded against the air draft by a baffle 50 at any given moment is the portion of the screen which is being mechanically scraped by the corresponding scraper 62 to rid it of any accumulated foreign material, the shielding of the screen against the draft facilitating the removal of the material by the scraper.

The self-cleaning radiator screen hereinbefore described is efficient, trouble free, and requires little or no maintenance. It eliminates the problem of over-heating of the engine with which it is associated.

While the radiator screen has been described in connection with use on farm machinery or the like, it can be used with any radiator screen in which there is a problem of plugging of the screen by foreign matter.

It is obvious from the foregoing description and drawings that the detailed arrangement and construction of the various elements may be modified considerably without departing from the spirit of the invention which must not be considered as limited strictly to the construction shown and described.

The embodiments of the invention in which an exclusive property or privilege is claimed are defined as follows:

1. In combination, a cooling means for an engine or the like, air filtering means in the air flow path to said cooling means, said air filtering means comprising a stationary screenlike member of hollow cylindrical shape, said screenlike member having a central axis with respect to which the periphery of said screenlike member is radially spaced, fan means for drawing air through said air filtering means from the exterior to the interior thereof, duct means extending from said filtering means to said cooling means for communicating the air drawn through said filtering means to said cooling means, a shaft lying along said central axis of said screenlike member, means for rotatably driving said shaft, first support means carried by said shaft and projecting beyond the outer periphery of said screenlike member, scraper means carried by said first support means and positioned to engage substantially the entire axial length of the exterior surface of said screenlike member whereby to remove foreign matter deposited on said exterior surface, second support means carried by said shaft and lying within said screenlike member, and baffle means carried by said second support means and positioned adjacent the interior surface of said screenlike member in substantial radial alignment with said scraper means and extending substantially the entire axial length of said interior surface, whereby passage of air is substantially prevented through the portion of said screenlike member which is being scraped at any given moment as said shaft is being rotated.

2. An air filtering means adapted to be positioned in an air flow path comprising a stationary screenlike member of hollow cylindrical shape, said screenlike member having a central axis with respect to which the periphery of said screenlike member is radially spaced, a rotatable shaft lying along said central axis of said screenlike member, first support means carried by said shaft and projecting beyond the outer periphery of said screenlike member, scraper means carried by said first support means and positioned to engage substantially the entire axial length of the exterior surface of said screenlike member whereby to remove foreign matter deposited on said exterior surface, second support means carried by said shaft and lying within said screenlike member, and baffle means carried by said second support means and positioned adjacent the interior surface of said screenlike member in substantial radial alignment with said scraper means and extending substantially the entire axial length of said interior surface, whereby passage of air is substantially prevented through the portion of said screenlike member which is being scraped at any given moment as said shaft is being rotated.

References Cited

UNITED STATES PATENTS

| | | | |
|---|---|---|---|
| 2,083,812 | 6/1937 | Barrett | 210—393 |
| 2,352,303 | 6/1944 | Young | 210—393 X |
| 2,455,734 | 12/1948 | Clausen. | |
| 2,601,704 | 7/1952 | Streun | 55—294 |
| 2,609,064 | 9/1952 | King | 55—296 |
| 2,827,175 | 3/1958 | Cataldo | 210—396 |
| 2,854,086 | 9/1958 | Schmidt. | |
| 3,002,585 | 10/1961 | Pasturczak | 55—290 |
| 3,155,473 | 11/1964 | McNeil | 55—294 |
| 3,190,817 | 6/1965 | Neugebauer et al. | |
| 3,251,175 | 5/1966 | Black | 55—294 |

HARRY B. THORNTON, *Primary Examiner.*